United States Patent [19]
Trachtman

[11] 3,756,702
[45] Sept. 4, 1973

[54] METHOD FOR PRODUCING PRECISELY FITTED CONTACT LENSES

[76] Inventor: Eugene Trachtman, 346 Harding Rd., Fair Haven, N.J.

[22] Filed: Oct. 20, 1971

[21] Appl. No.: 191,081

Related U.S. Application Data

[63] Continuation of Ser. No. 802,309, Jan. 24, 1969, abandoned.

[52] U.S. Cl. .............................................. 351/40
[51] Int. Cl. ............................................ A61b 5/10
[58] Field of Search ...................... 351/6, 7, 39, 40; 350/177

[56] References Cited
UNITED STATES PATENTS

| | | | |
|---|---|---|---|
| 3,108,523 | 10/1963 | Nuchman et al. | 351/7 X |
| 2,279,795 | 4/1942 | Nissel | 351/40 |
| 3,519,338 | 7/1970 | Papwitz | 351/7 |
| 3,169,459 | 2/1965 | Friedberg et al. | 351/7 X |

OTHER PUBLICATIONS

Mandell, "Profile Method of Measuring Corneal Curvature," J. Amer. Optom. Assoc., Vol. 32, No. 8, pp. 627–631, 3/1961

Taylor, "Outlining Corneal Contour," The Optician, pp. 503–505, Vol. 145, No. 3764, 5/24/63

Primary Examiner—Ronald L. Wibert
Assistant Examiner—Paul A. Sacher
Attorney—Popper, Bain, Bobis & Gilfillan

[57] ABSTRACT

Apparatus and method for producing contact lenses precisely fitted to the eye including the steps of preparing a phtographic profile of the anterior surface of the eye from the axis thereof radially outwardly to or past the limbal area, the photographic profile having a known, exacting proportional size relationship to the eye; enlarging the photographic profile by a predetermined, precise degree; superimposing upon the enlarged profile any desired, corrective radius to produce a composite curve; preparing a template in precise conformity with the composite curve; and generating anterior and posterior surfaces on a contact lens by use of the template, the posterior surface of the contact lens being fitted to any degree of precision desired to the anterior surface of the eye to which it is to be applied.

5 Claims, 18 Drawing Figures

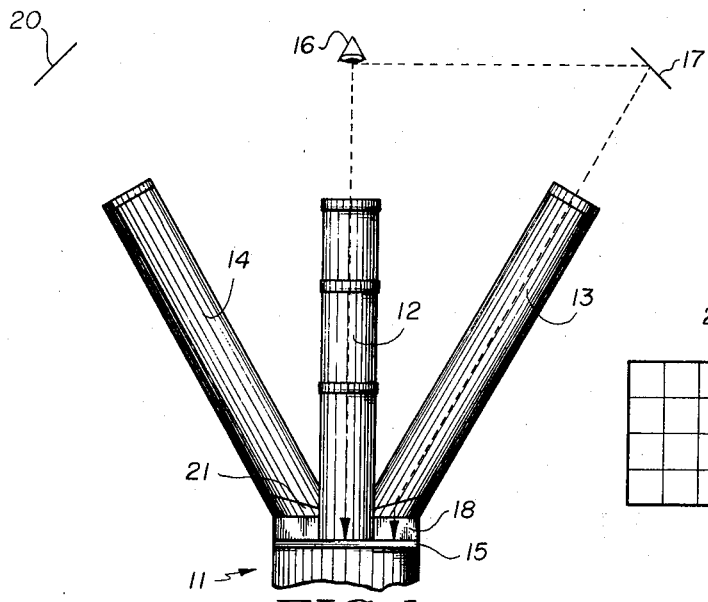
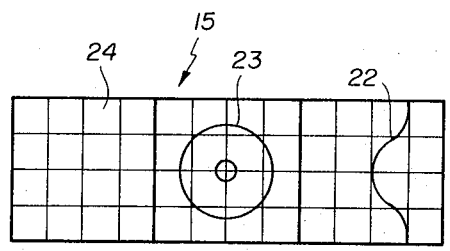
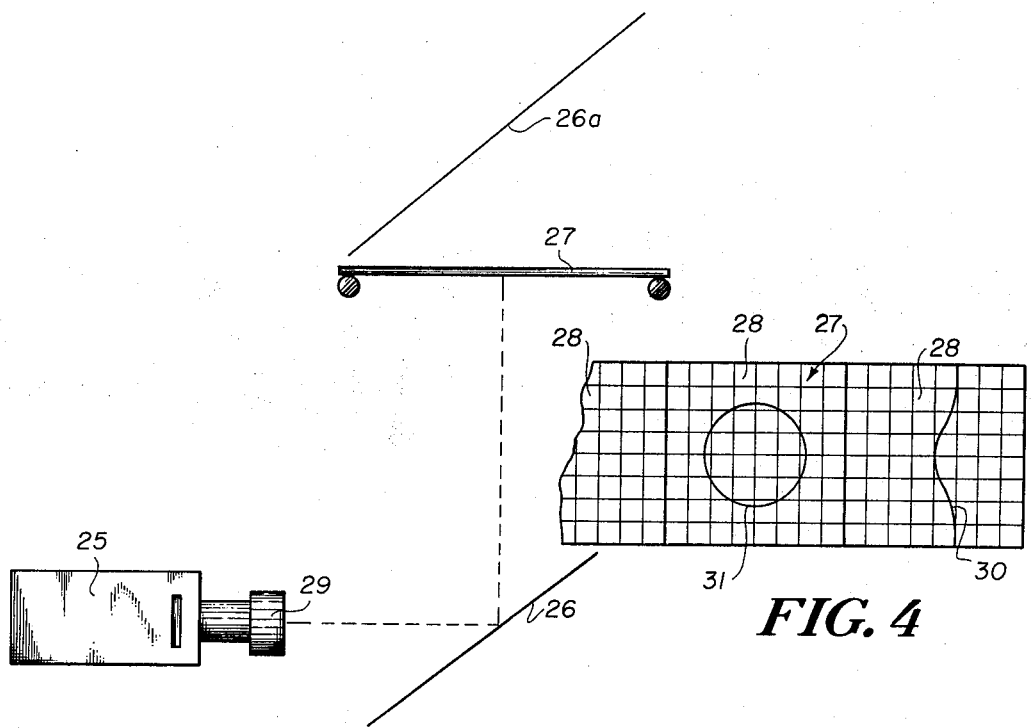
FIG. 1
FIG. 2
FIG. 3
FIG. 4
INVENTOR
EUGENE TRACHTMAN
BY Popper, Bain + Bobis
ATTORNEYS

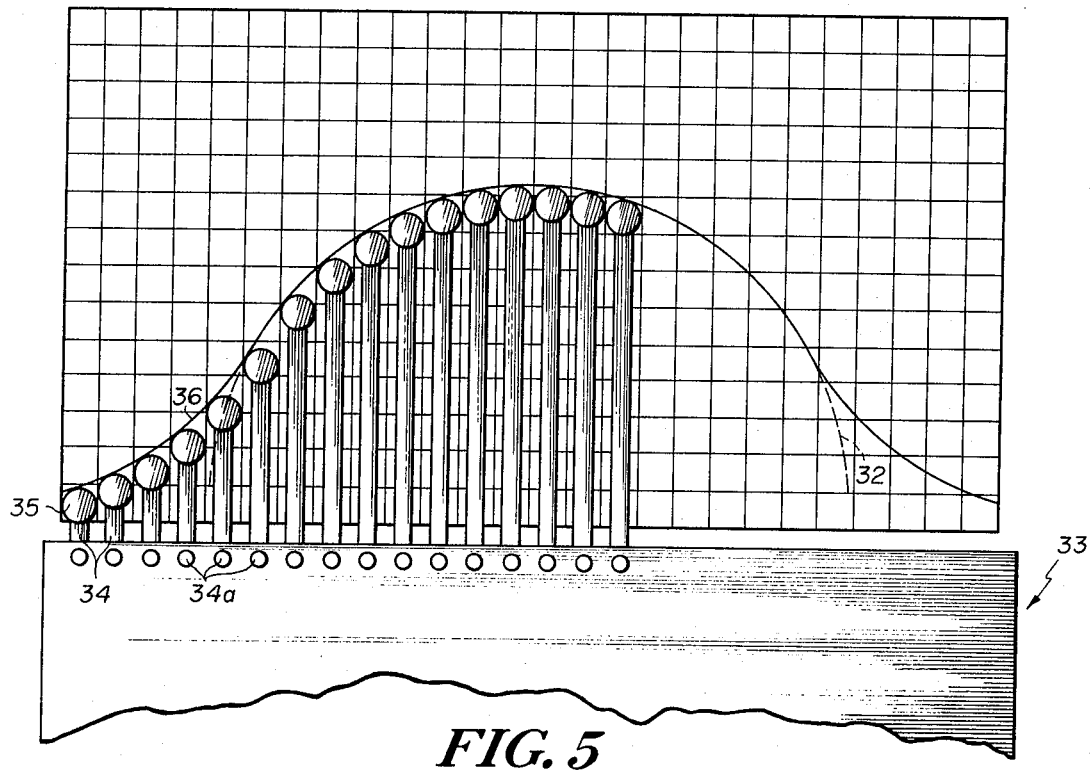
FIG. 5
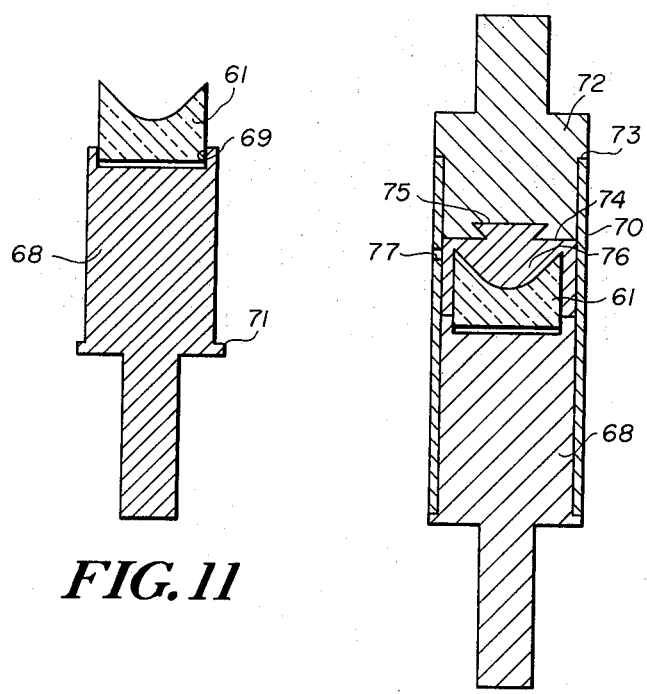
FIG. 11
FIG. 12
FIG. 13
INVENTOR
EUGENE TRACHTMAN
ATTORNEYS

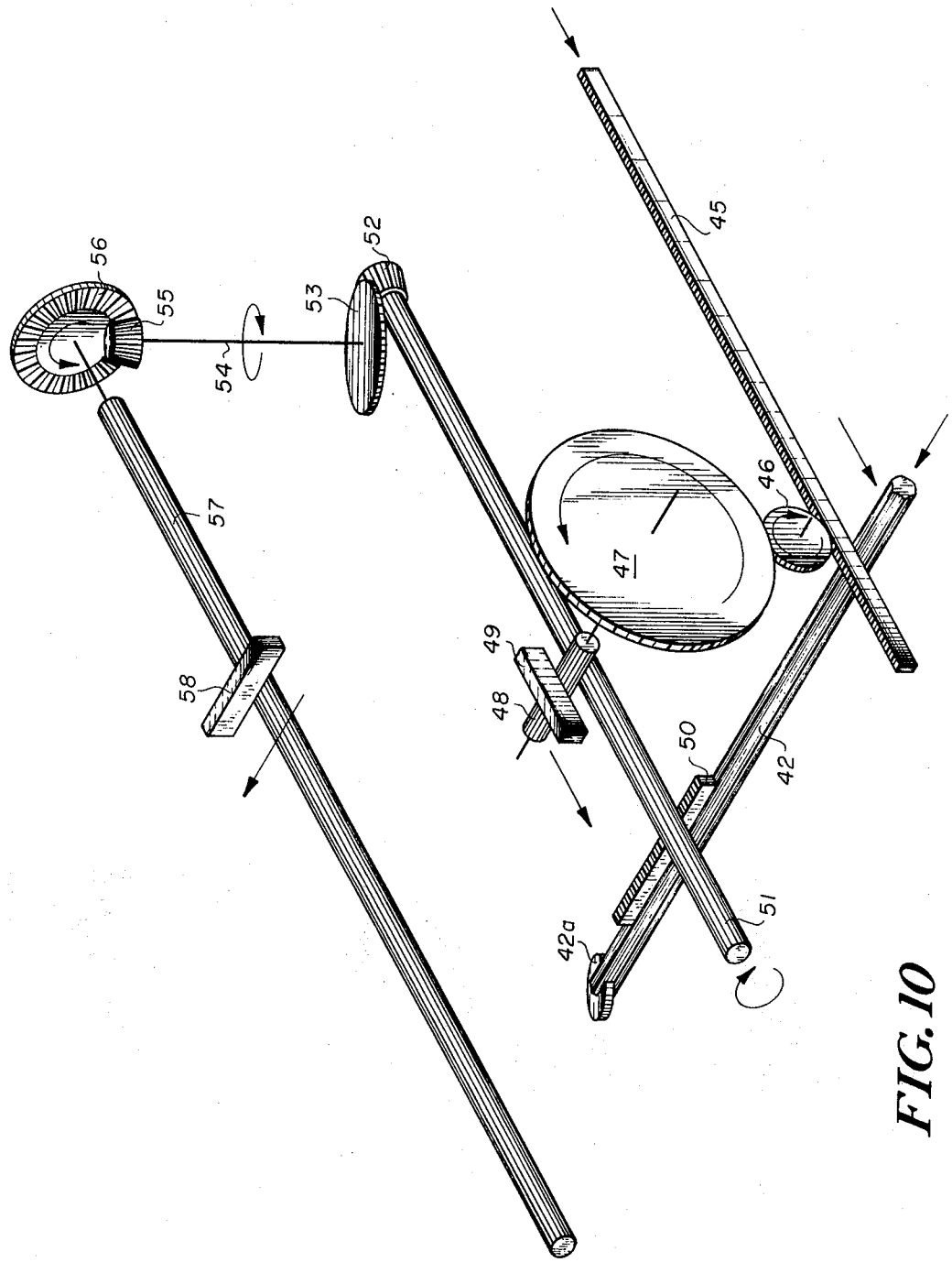

PATENTED SEP 4 1973 3,756,702

INVENTOR
EUGENE TRACHTMAN

BY
ATTORNEYS

METHOD FOR PRODUCING PRECISELY FITTED CONTACT LENSES

This is a continuation of now abandoned Application Ser. No. 802,309, filed Jan. 24, 1969.

BACKGROUND OF INVENTION

There are two types of contact lenses in popular use today; the first type is diametrically just sufficiently wide to cover generally the area of the pupil of the eye; the second is diametrically just sufficiently large to project to and perhaps slightly beyond the limbal area of the eye. The relatively small contact lens, aforesaid, tends to change position when the eye is blinked so that the axis of the lens and the axis of the eye are not coincident and the lens rests upon an area of the cornea having a non-conforming curvature, thereby causing discomfort until the lens returns to its proper alignment with the axis of the eye over the pupil.

The larger type of contact lens frequently irritates the eye. This irritation is generated by the edge of the lens which sharply engages the flattened limbal area. It must be borne in mind that the anterior surface of the humancornea human cornea a parabolic curve rather than a spherical curve of constant radius. At the limbal area, the curvature of the eye substantially flattens. Thus, a contact lens which is diametrically wide enough to extend radially from the axis of the eye to the limbal area and which has a spherical curvature, tends to dig into the limbal area and thereby irritate the eye. Using a soft contact lens material would alleviate this condition somewhat.

Moreover, irritation of the eye can be generated by impingement of the lens at the apex of the cornea. Since the anterior surface of the cornea of the eye is a parabola rather than a sphere of constant radius, a contact lens with a spherical posterior surface having a greater radius of curvature than the cornea of the eye may rest heavily upon the cornea at the apex.

The problem of properly fitting contact lenses to the eye is even further complicated by the fact that the physical dimension of the eye varies significantly from person to person, thereby generating still another source of poorly fitting contact lenses.

As a result, existing contact lenses are cut from a blank which is initially merely an approximation of the dimension of the eye to which it is to be applied. The posterior surface of the lens is provided with a spherical curvature, which is also merely an approximation of the actual radius of curvature of the eye which constantly changes. Thus, both the size and the radius of curvature of the posterior surface of the contact lens are not precisely fitted to the anterior surface of the particular cornea and limbal area to which it is to be applied.

At the limbal area, the curvature of the eye drastically flattens. As a consequence, contact lenses which are dimensioned diametrically and arcuately in an imprecise manner, tend to impinge on the eye either at the apex of the cornea or at the limbal area. For instance, if the parabolic curvature of the anterior surface of the cornea is greater than the spherical radius of curvature of the posterior surface of the contact lens at the axis thereof, the lens tends to rest at one point directly upon the apex of the cornea. On the other hand, if the diameter of the contact lens is greater than the diameter of the cornea, the periphery of the contact lens tends to impinge the anterior surface of the eye at the limbal area. In either instance, irritation of the eye results.

In order to obviate irritation of the eye in the vicinity of the limbal area, some contact lenses are ground by means of a ball in steps or stages at the periphery to flatten the posterior surface thereof. However, the amount of flattening possible is drastically limited by the thickness of the lens, since as the periphery of the lens is thinned, a sharp knife edge tends to be generated. Since the curvature of the eye drastically flattens at the limbal area, such grinding techniques cannot sufficiently flatten the anterior surface and constitute a very poor compromise.

Therefore, it is desirable to provide a posterior surface on a contact lens closely conforming to the anterior surface of the cornea and limbal area to the sclera. In addition, since human eyes vary in dimension as well as curvature, it is desirable to produce such an posterior surface dimensioned to closely conform to the dimension of the eye to which it is to be applied.

Attempts to measure the curvature of the human eye by means of a keratometer have been unsuccessful. The keratometer measures a radius of curvature in an area having a diameter of no more than three to four millimeters and is normally employed to measure the curvature of the cornea in the area of the pupil. Some have proposed the use of the keratometer to measure the curvature of the cornea at zones peripheral to the pupillary area. However, this procedure is not only time consuming but inexacting, since the use of the keratometer depends upon the patient's properly focusing the eye at a particular point.

In addition, even if the radius of curvature of the cornea were to be measured, no known grinding devices can reproduce parabolic curves with a high degree of accuracy.

Therefore, it is among the objects and advantages of this invention to provide apparatus and methods for producing a contact lens having a posterior surface in close conformity with the central or central-limbal anterior surface of the cornea or corneal-scleral area to which it is to be applied, or which is different than the actual curvature to a known and precisely controlled degree if a tighter or looser than normal fit is desired.

Another object of the present invention is to provide methods for producing an exact, enlarged photographic profile of the eye and employing this profile to produce a template or cutting instrument for generating a posterior surface on a contact lens precisely conforming to the anterior surface of the eye to which it is to be engaged and including corrective radii on both the anterior and posterior surfaces.

Still another object of this invention is to provide contact lens grinding apparatus capable of precisely generating both an anterior and a posterior surface on a contact lens by use of the aforesaid template.

Yet a futher object of this invention is to provide apparatus for producing a precisely enlarged photographic profile of the eye without the use of either sophisticated equipment or personnel.

Still yet another object of this invention is to provide apparatus and methods for producing a cutting tool precisely shaped and dimensioned to generate a precisely fitted posterior surface on a contact lens, which cutting tool may be employed in ordinary existing grinding equipment.

SUMMARY OF INVENTION

Apparatus and methods for producing contact lenses precisely fitted to the eye to which they are to be applied including the steps of preparing a photographic profile of the anterior surface of the eye, including the central and limbal area of the cornea and part of the sclera, said photographic profile having a precisely known relative size relationship to the eye; producing an enlargement of the photographic profile of the eye bearing a known, precise size relationship to the eye; superimposing a desired corrective radius on the enlarged profile to produce a composite curve; preparing a template of the composite curve and employing the template to produce either a contact lens or a cutting instrument to cut a contact lens having a posterior surface in precise conformity to the anterior surface of the eye to which it is to be applied, as well as an anterior surface which controls the thickness and power of the lens.

The invention also includes apparatus for producing the aforesaid photographic profile; apparatus for enlarging the profile and superimposing thereon a desired corrective radius; apparatus for producing the template aforesaid and apparatus for employing the template to produce either a contact lens having the same profile or a larger or smaller profile as desired or a tool for cutting a contact lens having the same profile or larger or smaller profile.

PREFERRED EMBODIMENT OF INVENTION

The objects and advantages aforesaid as well as other objects and advantages may be achieved by the procedure hereinafter set forth and by use of the apparatus, a preferred embodiment of which is illustrated herein, in which:

FIG. 1 is a schematic, plan view of apparatus for producing a photographic profile of the eye;

FIG. 2 is a schematic view of a film plate produced by use of the apparatus illustrated in FIG. 1;

FIG. 3 is a schematic, side elevational view of apparatus for producing an enlargement of the photographic profile of the eye;

FIG. 4 is a schematic view of the projection screen shown in FIG. 3;

FIG. 5 is a schematic, plan view of apparatus for producing a template of a composite curve including the cornea and a desired corrective radius;

Figure 6:
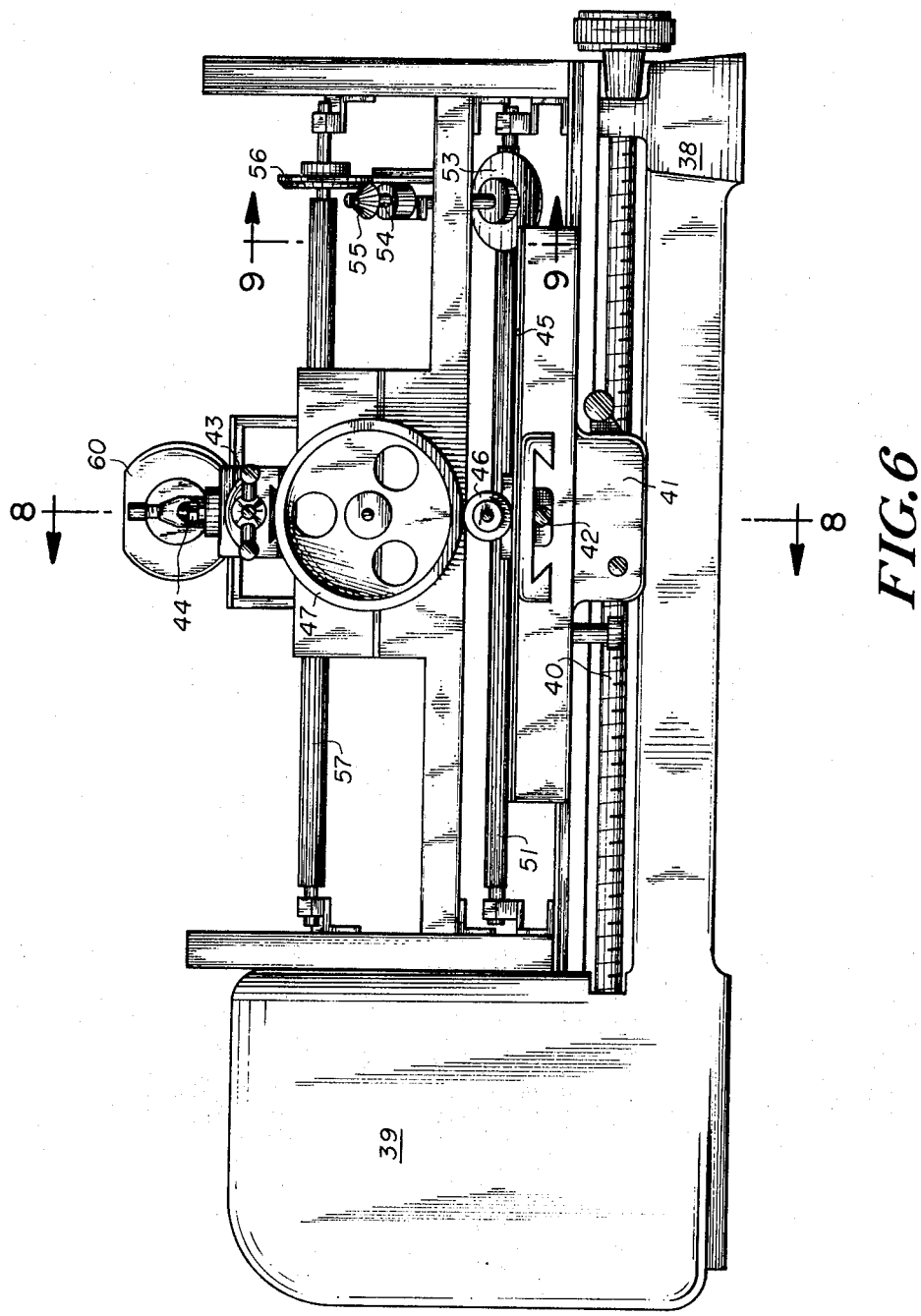
FIG. 6 is a side elevational view of a grinder for generating contact lenses by use of the template aforesaid.
Figure 7:
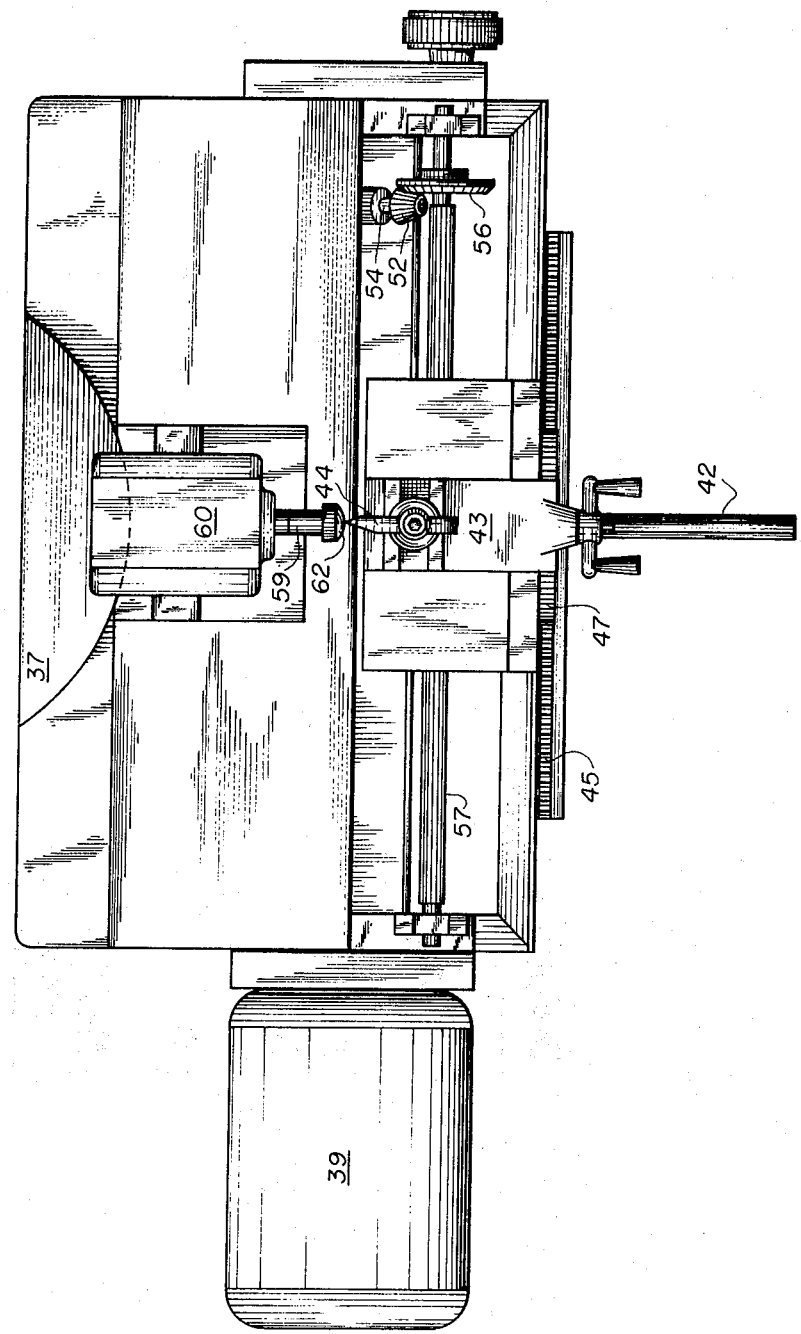
FIG. 7 is a top plan view of the grinder illustrated in FIG. 6.
Figure 8:
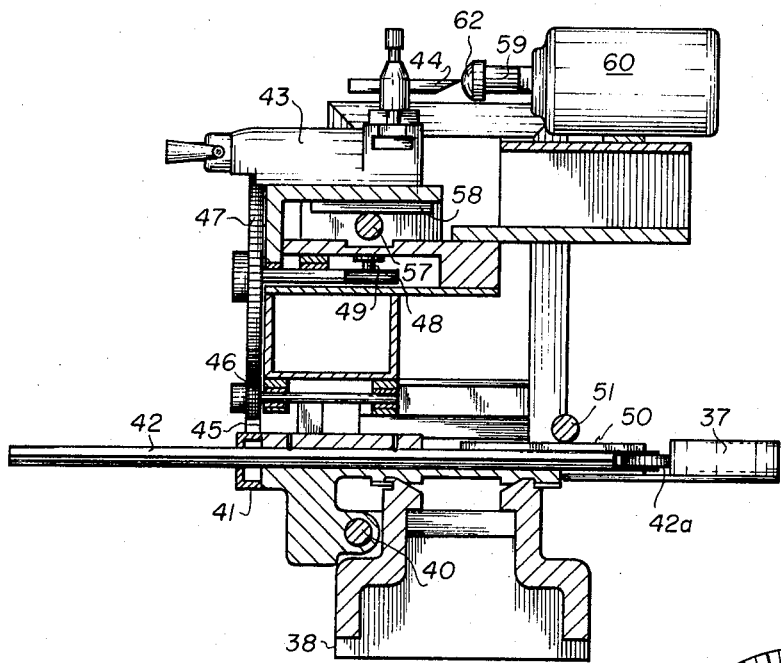
Figure 9:
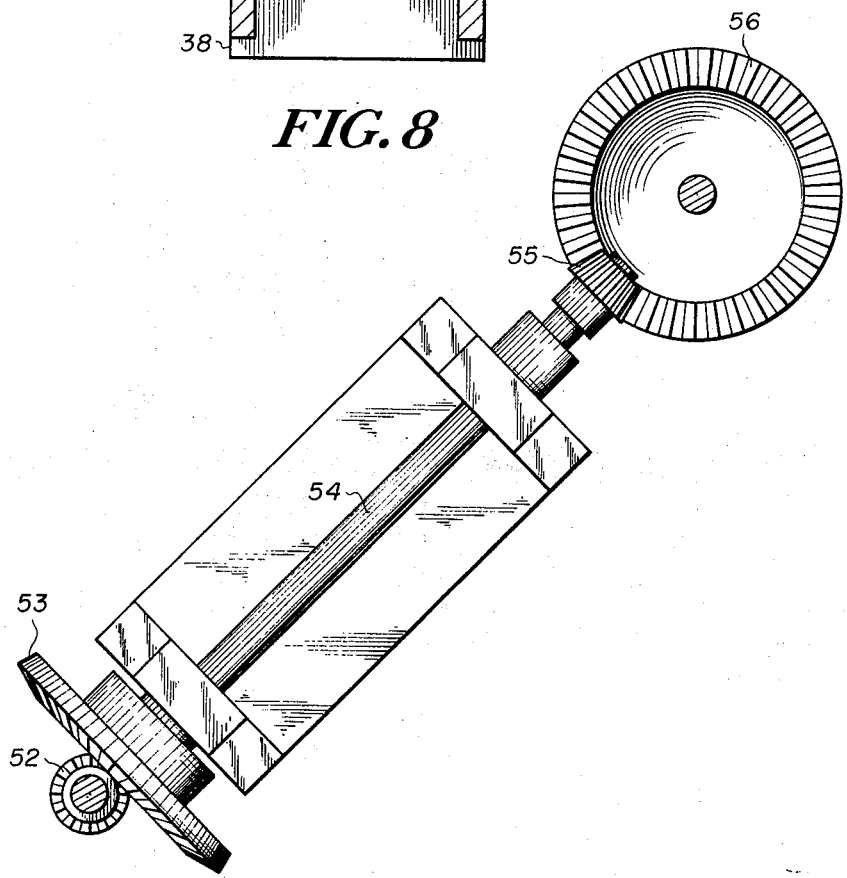
Figure 14:
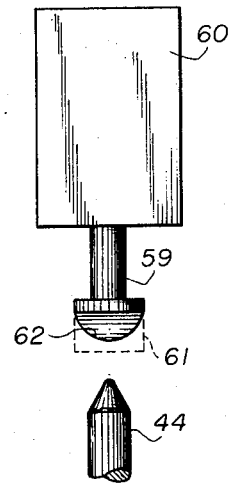
Figure 15:
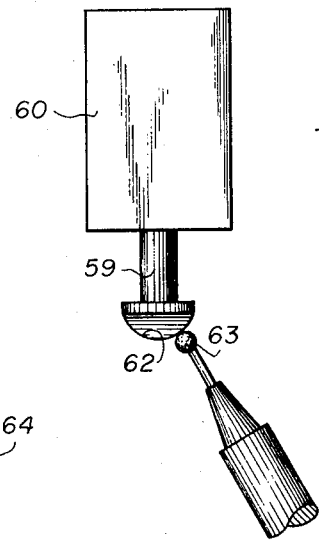
Figure 16:
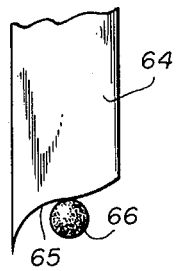
Figure 17:
Figure 18:
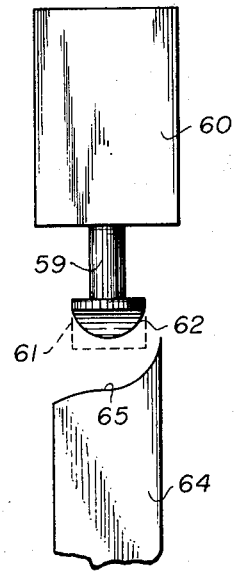

FIG. 8 a side elevational, cross-sectional view of the grinder taken along line 8—8 in FIG. 6, looking in the direction of the arrows;

FIG. 9 is a side elevational, cross-sectional view of the grinder taken along line 9—9 in FIG. 6, looking in the direction of the arrows;

FIG. 10 is a schematic view in perspective of the follower drive mechanism of the grinder illustrated in FIG. 6;

FIG. 11 is a side elevational, cross-sectional view of a contact lens blank and blank chuck;

FIG. 12 is a side elevational, cross-sectional view of the lens blank and chuck illustrated in FIG. 11 with a transfer chuck engaged thereto;

FIG. 13 is a side elevational, cross-sectional view of the contact lens blank illustrated in FIGS. 11 and 12 with the transfer chuck secured thereto;

FIG. 14 is a schematic plan view of a contact lens blank secured to the turrethead of the grinder;

FIG. 15 is a schematic plan view of another form of grinder applied to the contact lens in the turrethead;

FIG. 16 is a schematic plan view of a contact lens cutting tool engaged to a grinder;

FIG. 17 is a schematic side elevational view of the contact lens cutter and grinder illustrated in FIG. 16;

FIG. 18 is a schematic plan view of the contact lens cutter illustrated in FIGS. 16 and 17 in juxtaposition to a contact lens in the grinder turrethead.

APPARATUS AND METHOD FOR PRODUCING A PHOTOGRAPHIC PROFILE OF THE EYE

The first step of the method for producing precisely fitted contact lenses is to produce a photographic profile of the eye to which the lens is to be applied. The photographic profile must bear a precisely known and exacting size relationship to the size of the eye in order that its use thereafter will produce a contact lens which will have both the same dimension and curvature as the anterior surface of the eye plus a corrective radius.

The apparatus for producing the photographic profile of the eye is illustrated in FIG. 1 and comprises a special camera 11 having three lenses 12, 13 and 14 respectively. Each of the lenses 12, 13 and 14 project separate images on a photographic plate 15 illustrated in detail in FIG. 2.

Lens 12 is positioned with its axis coincident with the axis of the eye 16. Lenses 13 and 14 are disposed at eaual angles to lens 12 on opposite sides thereof.

A mirror 17 projects a profile image of the eye 16 through a camera lens 13 and through a prism 18 to the photographic plate 15. A similar mirror 20 may be employed to project the image of the other eye, not illustrated herein, through camera lens 14 and a prism 21 where it is in turn projected on the photographic plate 15.

The photographic profile of the eye projected on the photographic plate 15 must bear a precise dimensional relationship to the eye itself. In addition, the profile of the eye is best taken through a vertical plane coincident with the axis of the eye. Thus, the camera must be positioned at a precisely known distance from the eye.

Means are provided for positioning lens 12 at a precise distance from the eye 16. Such means may be any one of a number of well known focusing devices such as merging split images or spots or by the use of mires. When the lens 12 is at a proper distance from the eye 16, the plan of the eye seen by lens 12 will be in focus.

It is also imperative that the axis of the eye 16 be closely coincident with the axis of the lens 12. The patient focuses his eye on a grid or spot on the surface of the lens 12, or on projected targets to correct for parallax. The doctor also sights on the eye on a grid through the lens 12 to center the iris.

When the lens 12 is positioned at a proper distance from the eye 16 and the axis of the lens 12 is coincident with the axis of the eye 16, the profile image of the eye 16 projected through mirror 17 and camera lens 13 is projected on the film plate 15. By proper matching of the angle between lenses 12 and 13 as well as their characteristics, the profile image 22 will bear the same proportional relationship to the eye as the plan image 23 and will be taken through a vertical plane coincident with the axis of the eye 16.

The film plate 15 is exposed to produce profile image 22 and plan image 23 of the eye 16 simultaneously. A grid 24 is imposed on the film plate 15 in order to insure that the eye and camera interrelationships have not been improperly set. If, for instance, the patient shifted his eye 16 so that the axis of the eye was not coincident with the axis of the lens 12, the plan image of the eye 23 would not be centered on the grid 24. This would in turn indicate that the profile image 22 would be distorted.

If the eye 16 is out of focus, there will be a decentration of the profile 22 from the center grid line forward or back, and the amount of error can be corrected if necessary, during the projection stage. Even though the eye 16 is out of focus, the plan image 23 is still centered on the grid 24.

Similarly, in the event that the axis of eye 16 was parallel to the axis of the lens 12 but not coincident therewith, the plan image 23 of the eye 16 on the film plate 15, would be displaced from the center. The effective distance between the mirror 17 and the eye 16 would be altered as a consequence and the profile image 22 either enlarged or decreased by the change in distance. This malpositioning of the axis of the eye 16 would be detected and an appropriate correction could be made during the projection stage to be hereinafter described.

A profile image of the other eye is made in the same manner through camera lens 14. This image is also produced on another plate 15.

PRODUCTION OF ENLARGED PROFILE AND ADDITION OF CORRECTIVE CURVATURE

The next step of the procedure is to enlarge the profile image 22 and to combine it with a desired corrective radius to produce a composite curve which will be the curve of the posterior surface of the contact lens.

In order to produce the enlargement, the profile image 22 and the plan image 23 are projected through a projector 25 illustrated in FIG. 3. The images 22 and 23 may be projected directly or through a mirror 26 onto a ground glass screen 27 illustrated in FIG. 4. The grid 24 on the film plate 15 is projected onto the ground glass screen 27. The ground glass plate 27 is provided with its own grid 28. If the eye was not properly centered when photographed, the degree of misalignment will be apparent on the film plate illustrated in FIG. 2. The degree of misalignment is adjusted by means of zoom lens 29 on the projector 25. The degree of correction is determined by calibrating the zoom lens 29 with the grid 24 on the film plate 15.

The grid 28 on plate 27 is employed to center the profile image 30.

When properly corrected for any misalignment in the film plate 15, the profile image 30 bears a precisely known size relationship to the size of the eye and represents the profile of the cornea, the limbal area and the sclera if desired.

Optionally, the ground glass screen 27, which may be positioned in a horizontal plane, is provided with a mirror 26a which reflects images projected on the screen 27 to a viewer. By use of this mirror, a viewer may examine the images on the ground glass plate 27 from a vertical plane.

After the enlarged profile image 30 has been properly adjusted on the ground glass screen 27, it is matched with an enlarged corrective radius 32 illustrated in dotted lines in FIG. 5. The corrective radius 32 represents the spherical curvature to be applied to the lens to obtain the proper power for the eye to which it is to be applied. The radius 32 may be applied to the ground glass screen 27 by means of projection or by means of a transparent overlay. It should be noted that ground glass screen 27 is free to move in the horizontal plane to facilitate alignment of the projected image, the corrective curve overlay is also free to move in the horizontal plane. Such movement of screen 27 avoids the necessity of moving the projector 25 for alignment purposes.

The radius 32 is brought into tangency with the enlarged profile 30 at the projected axis of the eye. The radius 32 and the profile 30 together form a composite curve which will become, when reduced, the curvature of the posterior surface of the contact lens. As a practical matter, this curve parallel for controlled thickness can also be the anterior surface of the lens. Of course, the anterior surface is also corrected for the proper power.

PRODUCING THE TEMPLATE

A template of the composite enlarged curve is next produced. The template may be produced by use of a frame 33 having a plurality of axially elongated slides, slidably mounted therein. Each of the slides 34 is provided at its terminal end with a cylindrical magnet 35. The frame 33 is positioned beneath the composite curve on the ground glass screen and the slides 34, 34 raised until their respective magnets 35 are tangent on the composite curve. Each slide 34 is fixed in position by thumbscrew 34a. A piece of soft, malleable and magnetically permeable iron 36 is layed over the ends of the magnets 35 and defines the composite curve. The slides 34 are locked into position in the frame by any convenient means, to produce template 37.

The composite curve now defined by the iron strip 36 may be traced on any convenient material and the material cut to produce another template. The template in turn may be employed to grind the curve defined by the template 37 on a contact lens button or blank. In the alternative, the template may be employed to grind a cutting tool which may in turn be employed to cut the contact lens.

GRINDING THE CONTACT LENS

In order to grind the contact lens from the template, the starting blank or button of plastic or contact lens material is clamped to a chuck which is rotatably driven by a lathe head. A cutting tool which is controlled by the template is engaged to the rotating blank and the surface of the lens produced in that fashion.

Most grinding instruments which follow a template employ pivotally interlocked arms in the nature of a pantograph for the purpose of reproducing in different proportions the curve of the template. However, a pantograph does not precisely and exactly reproduce the same curve, the proportions being slightly different depending upon the relative positioning of the arms of the pantograph. Since the lens must be ground perfectly, particularly with respect to curvature, slight errors introduced by the pantograph are not acceptable.

Therefore, the grinder illustrated in FIGS. 7, 8, 9 and 10 must be employed.

Referring now to the drawings in detail, the grinder comprises a base 38 having a motor 39 which drives a threaded transport 40. The threaded transport 40 is threadably engaged to a template follower carrier 41. A spring loaded template follower 42 is thus driven laterally by transport 40 to traverse the template from end to end.

It is necessary to translate the lateral movement of carrier 41 and hence template follower 42 along the template into simultaneous but proportionately reduced latitudinal movement of the cutter carrier 43 upon which cutter 44 is rigidly mounted. Latitudinal movement of template follower 42 in the carrier 41 causes latitudinal movement of a rack 45. Latitudinal movement of rack 45 rotates gear 46 which is meshed with reduction gear 47.

Reduction gear 47 is mounted on a shaft with gear 48. Gear 48 is engaged with rack 49 whereby rotation of gear 48 is translated into latitudinal movement of rack 49. Rack 49 is in turn rigidly coupled to the cutter carrier 43. Therefore, latitudinal movement of the template follower 42 is translated into proportionally reduced latitudinal movement of the cutter carrier 43 and hence, the cutter 44.

It is also necessary to translate axial movement of template follower 42 into axial movement of the cutter 44. This is accomplished by means of a rack 50, rigidly mounted on template follower 42. Rack 50 is engaged with elongated gear 51. Elongated gear 51 carries a bevel gear 52 at its end. Bevel gear 52 is engaged to planetary gear 53, carried by shaft 54. The opposite end of shaft 54 carries a bevel gear 55 engaged to a second planetary gear 56. Planetary gear 56 is mounted on an elongated gear 57. Elongated gear 47 is engaged to rack 58 which is rigidly engaged to cutter carrier 43. Thus, movement of the template follower 42 along its axis is translated into rotational movement of elongated gear 51 and rotational movement of elongated gear 57. Reduction is accomplished through gear train 52, 53, 55 and 56, such that axial movement of the cutter 44 is proportionally controlled by movement of rack 58 in response to rotation of elongated gear 57.

Thus, the cutter 44 moves simultaneously latitudinally and axially in response to both latitudinal and axial movement of template follower 42 in response to the vagaries of the curvature of the template 37. Since there is no pivotal movement of arms, there is no distortion in the movement of the template follower 42 with respect to the cutter 44. Precisely proportional latitudinal and axial movement of the cutter 44 is generated by a closed gear train.

GENERATION OF CONTACT LENS SURFACES

The anterior and posterior surfaces of the contact lens may be generated in one of two fashions. In the first fashion, a cylinder of plastic or contact lens material, known as a contact lens blank or button, is mounted in a chuck 68 on a rotable shaft 59 on the motor 60. The axis of the cylindrical button 61 is coincident with the axis of rotation of shaft 59. A cutting tool 44 is engaged to the button 61 starting at one periphery and moving latitudinally to the other periphery or one-half of the template due to rotation. Simultaneously, the cutting tool is moved parallel to the axis of rotation of the button 61 so that the combined movement generates a curve 62 corresponding to one surface of the lens. As illustrated in FIG. 14, the cutting tool is of a well known variety and has been employed to generate the anterior surface of the contact lens.

In the alternative, a rotating ball grinder 63 as illustrated in FIG. 15, may be employed instead of the common cutting instrument 44 illustrated in FIG. 14.

If either the fixed cutting tool 44 or grinding ball 63 are employed, technicians must have access to the proportioning lathe illustrated in FIGS. 6 through 13. Since this apparatus is costly, it is desirable to produce a cutting tool which may be rotationally interengaged with the face of the contact lens blank in an ordinary lathe. Such a cutting tool 64 is illustrated in FIGS. 16, 17 and 18. The cutting edge 65 of the tool 64 corresponds to either one-half or all of the curves of the particular face of the contact lens to be generated. The cutting edge 65 of the tool 64 is ground by means of a rotational, generally conical grinding tool 66 mounted on a rotatable shaft 67. The rotatable shaft 67 is moved in proportional correspondence to the template follower 42. The grinder 66 is connected to some dirve means through shaft 67 and the drive means are mounted on the cutter carrier 43 illustrated in FIGS. 6 through 13. The cutting tool 64 is then engaged to the contact lens button or blank 61, which is in turn rigidly and axially mounted on a rotating shaft 59, driven by motor 60. The curve defined by the cutting edge 65 of the cutting tool 64 generates the surface of the contact lens as illustrated in FIG. 18.

The anterior and posterior surfaces of the contact lens are generally parallel. The cylindrical button 61 is mounted axially on the face of a chuck 68 illustrated in FIG. 11. The chuck 68 is usually provided with a cylindrical recess 69 in its face and an adhesive between the bottom of the recess 69 and the face of the blank 61 retains the blank in position, or a press fit can be used. The first surface is cut into the lens as aforesaid to produce a configuration illustrated in FIG. 11, which corresponds to a posterior surface. However, the anterior surface may optionally be generated first.

After the first surface has been generated, an annular collar 70 is slipped over the chuck 69 resting on an annular glange 71. A second chuck 72, illustrated in FIGS. 12 and 13, is inserted within the end of collar 70 with the collar 70 abutting against an annular flange 73. The flange 73 spaces the face 74 of chuck 72 away from the previously cut surface of contact lens 61. The face 74 of the chuck 72 may be provided with an appropriate indentation or dovetail 75. A low melting point material 76 is poured into the cavity defined by the chucks 68 and 72 and the collar 70. Since the collar 70 is spaced away from the side of the contact lens 61, the low melting point material 76 surrounds at least a portion of the side of the contact lens 61. The low melting point material 76 may be added through a hole 77 in the collar 70 or in any other convenient manner. The polishing is done while the lens 61 is in the chuck.

When the low melting point material 76 solidifies, there is an intimate bond between the contact lens 61 and the low melting point material 76. This bond is substantially greater than the adhesive bond between chuck 68 and the contact lens 61. Therefore, the chuck 68 and the collar 70 may be withdrawn away from chuck 72, leaving the low melting point material as a joint between chuck 72 and the contact lens 61 as illustrated in FIG. 13.

Chuck 72 is then coupled with the shaft 59 of motor 60 so as to rotate contact lens blank 61. The anterior surface of the contact lens is then ground in precisely the same manner as the posterior surface was ground.

The low melting point material 76 is generally sufficiently soft to be ground away with the contact lens as it is formed. This guarantees the lens will be accurately centered at all times. The edge of the lens can be rounded and polished later. The low melting point material is then removed.

It should be noted that the template representing the curvature of the cornea and limbal area as enlarged, may be employed to provide a series of radii defining the curvature of the lens. Such radii may be determined by means of a lens clock which may be applied to the emplate at varying distances from the axis thereof. The readings of the lens clock at these varying positions along the curvature of the template provide a mathematical plot of the curvature of the eye.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

I claim:

1. A method for producing a precisely fitted contact lens from a photographic profile image of the eye along a plane passing through the axis of the eye comprising,
   a. exposing a photographic emulsion having a reference grid imposed thereon to a plan image of an eye through a first lens system,
   b. simultaneously exposing a photographic emulsion having a reference grid imposed thereon to a profile image of the same said eye along a plane passing through the axis of the eye projected through a second lens system, the profile image having a precisely known size relationship to the eye,
   c. developing the exposed photographic emulsions,
   d. enlarging the photograph of the profile image to a precisely known degree,
   e. superimposing on the said enlarged profile image any desired corrective radius,
   f. drawing composite curves for the anterior and posterior surfaces of a contact lens from a combination of the enlarged profile and corrective curves,
   g. preparing templates from the composite curves, and
   h. grinding cutting tools shaped to the curves of the said anterior and posterior surfaces by guiding a grinding tool with the said templates,
   i. cutting a contact lens blank with said cutting instruments to generate the said anterior and posterior surface.

2. A method for producing a precisely fitted contact lens from a photographic profile image of the eye along a plane passing through the axis of the eye comprising:
   a. the procedure in accordance with claim 1 and
   b. optically projecting the photograph of the profile image of the eye through a third lens system on a screen having a reference grid,
   c. optically altering the projected profile image on the screen to compensate for any misalignment and misforeseeing of the eye when photographed.

3. A method for producing a precisely fitted contact lens froma photographic profile image of the eye along a plane passing through the axis of the eye comprising:
   a. the procedure in accordance with claim 2 and
   b. precolibrating the third optical lens system with respect to the grids on the photographs of the plan and profile images.

4. A method for producing a precisely fitted contact lens from a photographic profile image of the eye along a plane passing through the axis of the eye comprising:
   a. the procedure in accordance with claim 3 in which
   b. the horizontal axis of the eye is maintained as coincident as possible with the axis of the first said lens system when the said emulsions are simultaneously exposed to both the said projected images, and
   c. both the profile and plane images are focused as precisely as possible on the said photographic emulsions.

5. A method for producing a precisely fitted contact lens from a photographic profile image of the eye along a plane passing through the axis of the eye comprising,
   (a) the procedure in accordance with Claim 1 and
   (b) grinding a cutting instrument shaped to the curves of the said anterior and posterior surfaces by means of a tool operatively connected to and guided by said template,
   (c) cutting a contact lens blank by means of said cutting instrument to generate anterior and posterior surfaces thereon, the posterior surface dimensionally closely conforming to the anterior surface of the said eye.

* * * * *

UNITED STATES PATENT OFFICE
CERTIFICATE OF CORRECTION

Patent No. 3,756,702                     Dated September 4, 1973

Inventor(s) EUGENE TRACHTMAN

It is certified that error appears in the above-identified patent and that said Letters Patent are hereby corrected as shown below:

Column 1, line 23, delete "humancornea".
Column 4, line 34, "eaual" should be --equal--.
Column 6, line 2, "The" should be --This--.
Column 6, line 30, "beneath" should be --above--.
Column 7, line 34, "47" should be --57--.
Column 8, line 42, "glange" should be --flange--.
Column 9, line 14, "emplate" should be --template--.
Column 9, line 49 should be deleted.
Column 10, delete lines 1-5 and insert in lieu thereof
--(h) cutting a contact lens blank by means of a tool operatively connected to and guided by said template to generate anterior and posterior surfaces thereon, the posterior surface dimensionally closely conforming to the anterior surface of the said eye.--
Column 10, line 17, "froma" should be --from a--.
Column 10, line 20, "precolibrating" should be --precalibrating--.

Signed and sealed this 15th day of October 1974.

(SEAL)
Attest:

McCOY M. GIBSON JR.
Attesting Officer

C. MARSHALL DANN
Commissioner of Patents